United States Patent [19]

Choe

[11] 4,423,202

[45] Dec. 27, 1983

[54] PROCESS FOR THE PRODUCTION OF HIGH MOLECULAR WEIGHT PARA ORDERED AROMATIC HETEROCYCLIC POLYMER

[75] Inventor: Eui W. Choe, Randolph, N.J.

[73] Assignee: Celanese Corporation, New York, N.Y.

[21] Appl. No.: 260,573

[22] Filed: May 5, 1981

[51] Int. Cl.$^3$ ...................... G08G 73/06; G08G 73/22
[52] U.S. Cl. ..................................... 528/179; 528/183; 528/185; 528/207; 528/208; 528/286; 528/289; 528/290; 528/291; 528/336; 528/337; 528/377
[58] Field of Search ............... 528/183, 185, 337, 179, 528/336, 377, 289, 290, 291, 286, 207, 208

[56] References Cited

U.S. PATENT DOCUMENTS 3,313,783 4/1967 Iwakura et al. ...................... 528/337
4,225,700 9/1980 Wolfe et al. .......................... 528/377

OTHER PUBLICATIONS

Makromolekulare Chemie, vol. 83, Polybenzazoles, 4/65 pp. 179–187, Imai et al.
*Research Polymers, New Linear Polymers,* McGraw-Hill Book Company, Nov. 14, 1968, pp. 331–349.

*Primary Examiner*—Lester L. Lee
*Attorney, Agent, or Firm*—Burns, Doane, Swecker & Mathis

[57] ABSTRACT

A process for the production of para ordered aromatic heterocyclic polymer is provided. The process comprises heating a first reactant with the dichloride derivative of at least one aromatic dicarboxylic acid in polyphosphoric acid at a temperature within the range of approximately 100° C. to 250° C. until the polymerization reaction is complete. The first reactant comprises at least one aromatic diaminodiol or at least one aromatic diaminodithiol, wherein each amine group is paired with a hydroxy group or a thiol group upon adjacent carbon atoms of the aromatic nucleus. Preferably, the process of the present invention is employed in the production of para ordered aromatic polybisoxazoles wherein the first reactant comprises at least one aromatic diaminodiol. In an especially preferred embodiment, the present invention provides a process for the production of high molecular weight polyparaphenylenebenzobisoxazole, the process comprising heating 4,6-diaminoresorcinol with terephthaloyl dichloride in polyphosphoric acid.

27 Claims, No Drawings

PROCESS FOR THE PRODUCTION OF HIGH MOLECULAR WEIGHT PARA ORDERED AROMATIC HETEROCYCLIC POLYMER

BACKGROUND OF THE INVENTION

The present invention provides a process for the production of para ordered aromatic heterocyclic polymers, particularly polybisoxazoles and polybisthiazoles. While processes for the production of such polymers are known in the prior art, such prior art processes have yielded polymers which exhibit such disadvantages as undesirably low molecular weight.

It is known, for example, to produce such polymers by reacting a diaminodiol or a diaminodithiol with a dicarboxylic acid in the presence of polyphosphoric acid. For example, polyparaphenylenebenzobisoxazole can be produced by reacting 4,6-diaminoresorcinol with terephthalic acid in the presence of polyphosphoric acid. However, the polymer which is produced exhibits an undesirably low molecular weight, and, when spun, yields fibers having undesirably low strength properties, especially modulus.

In U.S. Pat. No. 3,313,783 is disclosed a process for the preparation of polybenzimidazoles which utilizes as a reactant at least one dicarboxylic acid or a derivative thereof. The dicarboxylic acid derivatives include the dichlorides. However, this patent neither discloses nor suggests the use of such a reactant in the production of polybisoxazoles and polybisthiazoles.

Therefore, it is an object of the present invention to provide a process for the production of high molecular weight para ordered aromatic heterocyclic polymer.

It is also an object of the present invention to provide a process for the production of high molecular weight para ordered heterocyclic polymer wherein the dichloride derivative of at least one aromatic dicarboxylic acid is utilized as a reactant.

It is also an object of the present invention to provide a process for the production of para ordered aromatic heterocyclic polymer which exhibits a number average molecular weight of at least approximately 10,000.

It is also an object of the present invention to provide a process for the production of high molecular weight para ordered aromatic heterocyclic polymer which is capable of being spun into fibers which exhibit high strength properties.

It is also an object of the present invention to provide a process for the production of fibrillar para ordered aromatic heterocyclic polymer.

These and other objects as well as the scope, nature, and utilization of the process of the present invention will be apparent from the following description and the appended claims.

SUMMARY OF THE INVENTION

The present invention provides a process for the production of high molecular weight para ordered aromatic heterocyclic polymer. The process comprises heating the first reactant comprising at least one aromatic diaminodiol or at least one aromatic diaminodithiol, wherein each amine group is paired with a hydroxy group or a thiol group upon adjacent carbon atoms of the aromatic nucleus, with the dichloride derivative of at least one aromatic dicarboxylic acid in polyphosphoric acid at a temperature within the range of approximately 100° C. to 250° C. until the polymerization reaction is complete.

In a preferred embodiment, the present invention provides a process for the production of high molecular weight polyparaphenylenebenzobisoxazole which exhibits an inherent viscosity of at least approximately 2.0 dl./g. when measured at a concentration of approximately 0.2 weight/volume percent in methanesulfonic acid at 25° C. The process comprises the steps of:

(a) dehydrochlorinating a mixture of 4,6-diaminoresorcinol with terephthaloyl dichloride in polyphosphoric acid by heating the reaction mixture within the range of approximately 30° C. to 95° C. for a period of time sufficient to dehydrochlorinate said reaction mixture; and (b) polymerizing said reaction mixture by heating said reaction mixture within the range of approximately 100° C. to 250° C. until the polymerization reaction is complete.

DETAILED DESCRIPTION OF THE INVENTION

The present invention provides a process for the production of high molecular weight para ordered aromatic heterocyclic polymers; specifically, polybisoxazoles and polybisthiazoles. The polymers produced in accordance with the process of the present invention exhibit a number average molecular weight of at least approximately 10,000, e.g, within the range of approximately 10,000 to 30,000.

The first reactant employed in the process of the present invention comprises at least one aromatic diaminodiol or at least one aromatic diaminodithiol. When the first reactant comprises at least one aromatic diaminodiol, a polybisoxazole is produced; when the first reactant comprises at least one aromatic diaminodithiol, a polybisthiazole is produced. The molecular structure of the first reactant is such that such that each amine group is paired with either a hydroxy group or a thiol group upon adjacent carbon atoms of the aromatic nucleus.

Preferably, the first reactant is selected from the group consisting of:

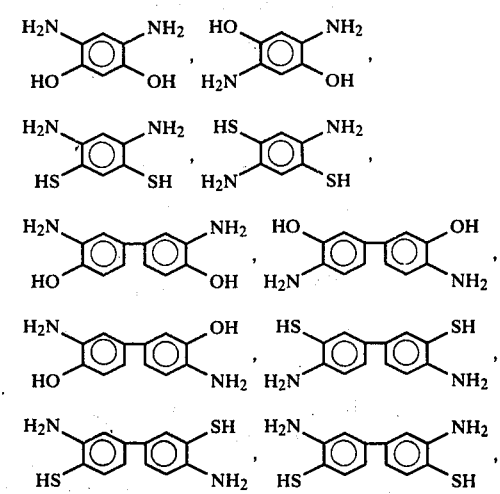

and mixtures thereof.

More preferably, the first reactant is a diaminodiol, and, in an especially preferred embodiment, is 4,6-diaminoresorcinol.

The first reactant is commonly supplied in the form of the dihydrochloride. For example, in the especially preferred embodiment, the first reactant is 4,6-diaminoresorcinol dihydrochloride having the formula

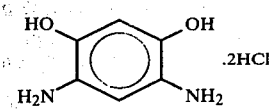

The process of the present invention utilizes as a second reactant at least one dihalogen derivative of at least one aromatic dicarboxylic acid. The halogen atoms of the dihalogen derivative may be F, Cl, Br, or I. Preferably, the dihalogen derivative is a dichloride derivative. More preferably, the dichloride derivative is selected from the group consisting of:

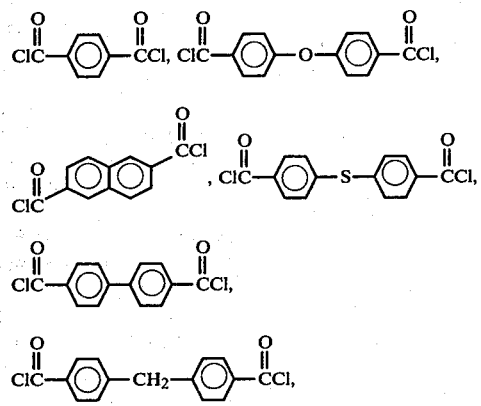

and mixtures thereof.

In an especially preferred embodiment, the second reactant is terephthaloyl dichloride.

The process of the present invention is conducted in the presence of polyphosphoric acid. The polyphosphoric acid used in the process of the present invention may be obtained, for example, by adding phosphorus pentoxide to ortho-phosphoric acid and heating the same to about 300° C., as illustrated by the following equation:

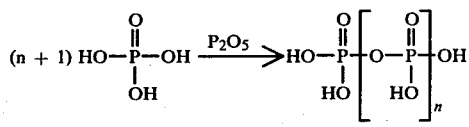

(1)

In the above equation, n represents a positive integer greater than 0.

Polyphosphoric acid is said to be a mixture of compounds of the above general formula having different values of n. Any polyphosphoric acid of the above formula wherein n is greater than 0 and which is a liquid at the reaction temperatures may be used in the process of the present invention. Generally, such polyphosphoric acid has a value of n within the range of approximately 1 to 8.

Ortho-phosphoric acid is obtained as shown in the following equation:

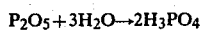

$P_2O_5 + 3H_2O \rightarrow 2H_3PO_4$

When the quantitative ratio of $P_2O_5$ to $H_2O$ exceeds the stoichiometric ratio shown in the above equation, polyphosphoric acids which are suitable for use in the process of the present invention are obtained as shown in the following equation:

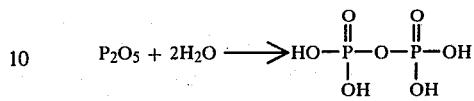

In other words, the polyphosphoric acid which is used in the process of the present invention may be defined by means of the amount of $P_2O_5$ used. Thus, when n is 0 in Equation (1) above, the amount of $P_2O_5$ used is said to be 100%. Accordingly, when n is greater than 0 in Equation (1) above, i.e., when a polyphosphoric acid is formed, the amount of $P_2O_5$ used is greater than 100%.

In the process of the present invention, it is preferred to use polyphosphoric acid having a $P_2O_5$ content of approximately 115%.

According to the process of the present invention, the first reactant, comprising at least one aromatic diaminodiol or at least one aromatic diaminodithiol, is heated with the dichloride derivative of at least one aromatic dicarboxylic acid in polyphosphoric acid at a temperature within the range of approximately 100° C. to 250° C. until the polymerization reaction is complete. Polymerization is commonly accomplished after a time period within the range of approximately 12 to 200 hours, e.g., approximately 24 to 96 hours and, preferably, 24 to 48 hours. The completion of the reaction is indicated by an increase in solution viscosity. The point at which the polymerization reaction should be terminated is obvious to those of ordinary skill in the art.

The reaction mixture is commonly heated prior to polymerization in order to dehydrochlorinate the reaction mixture. The dehydrochlorination is accomplished by heating the reaction mixture at a temperature within the range of approximately 30° C. to 95° C. for a period of time within the range of approximately 3 to 36 hours, e.g., for approximately 24 hours. Completion of the dhydrochlorination is indicated by the cessation of the bubbling caused by the release of HCl gas. Preferably, the dehydrochlorination is accomplished by a series of heating stages. For example, the reaction mixture may be heated at approximately 60° C. for a period of time on the order of approximately 16 hours and then further heated at approximately 90° C. for about 5 hours.

In one embodiment of the process of the present invention, the first reactant, the dichloride derivative, and the polyphosphoric acid are all mixed together, and the entire mixture is then dehydrochlorinated in the manner described above.

In another embodiment, the dichloride derivative and the polyphosphoric acid are mixed together, and the mixture is dehydrochlorinated in the manner described above in order to form the polyphosphoric acid ester, as discussed hereinafter. The first reactant, commonly in the form of the dihydrochloride, is then added and the resulting mixture is then once again dehydrochlorinated prior to polymerization.

Each of the above-described embodiments appears to work equally well, and either may be employed in the process of the present invention.

Following dehydrochlorination, the polymerization is begun. Preferably, the polymerization is conducted by stages, i.e., a step-wise heating schedule is employed. The step-wise heating is preferred because immediately exposing the reaction mixture to relatively high polymerization temperatures (e.g., on the order of approximately 200° C. and above) may cause decomposition of the monomers. As an example of a step-wise heating schedule, the polymerization may be begun at a relatively low temperature (e.g., approximately 130° C.) and the polymerization temperature subsequently increased in steps (e.g., of approximately 20° C. to 30° C.) at time intervals of several hours (e.g., approximately 3 to 5 hours) until the desired maximum polymerization temperature is attained. The selection of a particular step-wise heating schedule is obvious to one of ordinary skill in the art.

In the process of the present invention, the dichloride derivative is employed in an amount within the range of approximately 0.8 to 1.2 mole per mole of the first reactant. Preferably, the dichloride derivative and the first reactant are employed in substantially equal molar amounts. The polyphosphoric acid is employed in an amount within the range of approximately 10 to 120 times the weight of the first reactant.

The polymerization reaction mixture should be vigorously stirred while it is being heated. The vigorous stirring is necessary in order to obtain polymer which has a desirably high molecular weight and which can be used to produce articles having desirable properties.

cinol and terephthaloyl dichloride) exhibit a fibrillar texture. Fibrils containing many loose strands can be pulled from such polymers during work-up.

Unlike known processes, virtually no sublimation of the dicarboxylic acid (e.g., terephthalic acid) is observed during the process of the present invention. Such sublimation is commonly observed in prior art processes as completion of the polymerization reaction is approached. Sublimation reduces the concentration of the dicarboxylic acid which is available for polymerization, and polymers having undesirably low molecular weights are therefore formed. In the present process, the substantial absence of sublimation aids in the production of high molecular weight polymer. Sublimation during the process of the present invention is believed to be prevented by the formation of the polyphosphoric acid ester, as hereinafter discussed.

While the reaction involved in the process of the present invention is at present not completely understood, a presently accepted explanation is presented below using the reaction of 4,6-diaminoresorcinol and terephthaloyl dichloride in polyphosphoric acid as an example. It appears that the terephthaloyl dichloride reacts with the polyphosphoric acid to form a polyphosphoric acid ester of terephthalic acid with evolution of hydrochloric acid. The white milky ester reacts with 4,6-diaminoresorcinol in a polymerization reaction to yield polyparaphenylenebenzobisoxazole. This proposed reaction sequence is illustrated in the following equations:

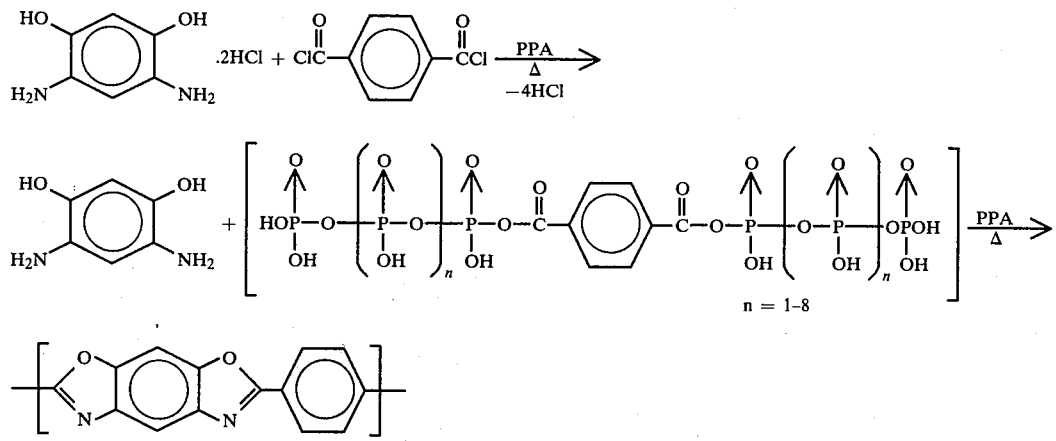

n = 1-8

Corrosion resistant spiral stirrers were found to operate more efficiently than turbine-type agitators. Modification of conventional polymerization equipment may be required in order to obtain the torque necessary to agitate the very viscous solutions of polymer and polyphosphoric acid. Such modifications would be obvious to those of ordinary skill in the art.

Polymers produced by the process of the present invention exhibit a higher molecular weight than corresponding polymers produced by prior art processes. The molcular weight is commonly indicated by the inherent viscosity of the polymer. The inherent viscosity of the polymers produced in accordance with the process of the present invention is commonly determined at a concentration of 0.2 weight/volume percent in methanesulfonic acid at 25° C. Because of the relatively high molecular weight, certain of the polymers prepared in accordance with the process of the present invention (e.g., that prepared from 4,6-diaminoresor- The polymers prepared in accordance with the process of the present invention may be used to produce fibers and ribbons. Fibers produced from polymers prepared according to the process of the present invention exhibit higher strength properties, particularly modulus, than fibers spun from polymers prepared according to prior art processes.

In order to extrude the polymers produced in accordance with the process of the present invention, dopes are prepared which contain approximately 7 to 15 percent by weight (e.g., approximately 8 to 10 percent by weight) of the polymer is a strong acid, such as 100% sulfuric acid, methanesulfonic acid, chlorosulfonic acid, mixtures of the foregoing, etc. Microscopic examination of certain dopes, such as that of polyparaphenylenebenzobisoxazole in methanesulfonic acid, show them to be in an anisotropic nematic liquid crystal state at room temperature.

Dopes prepared as described above may be spun into fibers by any conventional wet spinning technique. The coagulation bath commonly comprises water or a water/methanesulfonic acid mixture.

The effects of the concentration of methanesulfonic acid in the coagulation bath on fiber surface morphology and fiber mechanical properties were evaluated over the acid concentration range of 0 to 90 percent in water. It was found that good results were achieved in a coagulation bath which contained methanesulfonic acid, that best results being observed at a methanesulfonic acid/water ratio of 30/70.

Due to high shrinkage, it is difficult to cast films from the dopes described above. However, ribbons can be successfully extruded through a slit die (e.g., measuring 6 mm.×0.25 mm.) into a coagulation bath of water or water/methanesulfonic acid.

The properties of fibers spun from polymers prepared according to the process of the present invention may be increased still further by heat treatment. The fibers are commonly heated in an inert atmosphere (e.g., a nitrogen atmosphere) at temperatures within the range of approximately 425° C. to 525° C. (e.g., 500° C.).

The following Examples are given as illustrations of the invention. It should be understood, however, that the invention is not limited to the specific details set forth in the Examples.

EXAMPLE 1

Poly[(1,7-dihydrobenzo[1,2-d:4,5-d']-dioxazole-2,6-diyl)-4-phenylene] (polyparaphenylenebenzobisoxazole; PBO) was prepared from terephthaloyl dichloride and 4,6-diaminoresorcinol dihydrochloride in polyphosphoric acid.

Polyphosphoric acid (115%) was acquired from The FMC Corporation or MCD Manufacturing Chemists, Inc. and was deoxygenated by heating under nitrogen at 150° C. overnight. The polymerizations were carried out under nitrogen in 5 l. resin flasks equipped with a spiral agitator.

4,6-diaminoresorcinol dihydrochloride (100.99 g., 0.474 mole) and pulverized terephthaloyl dichloride (96.23 g., 0.474 mole) were placed under nitrogen in a 5 l. resin flask. Deoxygenated polyphosphoric acid was transferred under nitrogen into the flask. The mixture was stirred at 60° C. for 16 hours, and then at 90° C. for 5 hours to dehydrochlorinate. The following heating stages were used for the polymerization: 130° C. for three hours, 150° C. for sixteen hours, 170° C. for three hours, 185° C. for three hours, and finally 200° C. for 48 hours (24 hours in the case of Run No. 3).

At the end of the polymerization, the polymer was scooped out of the flask and precipitated from the polyphosphoric acid into 11.4 l. of methanol. The polymer was filtered, washed with methanol, and dried at 100° C. The inherent viscosity of the polymer was measured at a concentration of 0.2 weight/volume percent of methanesulfonic acid at a temperature of 25° C. The results are shown in Table I.

The polymer was dissolved in methanesulfonic acid and filtered. The filtrate was poured into methanol to precipitate the polymer. The polymer was filtered, washed consecutively with water, dilute ammonium hydroxide, water, and finally methanol. The polymer was then dried at 100° C. and a pressure of 0.1 torr. The inherent viscosity of the polymer was measured in the manner described above. The results are shown in Table I.

TABLE I

| RUN NO. | I.V.[a] (dl./g.) | I.V.[b] (dl./g.) |
|---|---|---|
| 1 | — | 2.04 |
| 2 | 3.88 | 2.78 |
| 3 | 3.57 | 2.44 |
| 4 | 2.10 | 2.06 |
| 5 | — | 1.71 |

[a]After precipitation from PPA
[b]After precipitation from MSA

Although a reduction in inherent viscosity was observed following precipitation of the polymer from methanesulfonic acid, the reduction is not believed to be due to any change in the molecular weight of the polymer.

COMPARATIVE EXAMPLE 1

Example 1 was followed with the exception that the terephthaloyl dichloride was replaced with terephthalic acid. In the case of Run No. 5, the polymerization vessel was heated at a final temperature of 210° C. for 48 hours.

The inherent viscosity of the polymer was measured after precipitation from methanesulfonic acid. The results are shown in Table II.

TABLE II

| RUN NO. | I.V. (dl/g) |
|---|---|
| 1 | 1.96 |
| 2 | 2.11 |
| 3 | 1.10 |
| 4 | 1.64 |
| 5 | 1.92 |
| 6 | 2.11 |
| 7 | 2.06 |

EXAMPLE 2

This Example illustrates the spinning of fibers from the polybenzobisoxazole prepared by Run No. 2 listed in Table I of Example 1. The spinning conditions for the fibers exhibiting the best as-spun properties are described.

An 8.6% polybenzobisoxazole dope was prepared by dissolving the polymer in a solvent of 97.5 parts methanesulfonic acid and 2.5 parts chlorosulfonic acid. The dope was spun through a 10×100 μm. spinneret into a coagulation bath having a methanesulfonic acid/water ratio of 30/70. The filaments were slightly spin stretchable, being capable of undergoing a spin draw ratio of 1.4. The as-spun properties were:

Tenacity: 4.2 g./d.
Elongation: 1.4%
Modulus: 502 g./d.

EXAMPLE 3

This Example illustrates the spinning of fibers from the polybenzobisoxazole prepared by Run No. 3 listed in Table I of Example 1. The spinning conditions for the fibers exhibiting the best as-spun properties are described.

An 8.6% polybenzobisoxazole dope was prepared by dissolving the polymer in a solvent of 97.5 parts methanesulfonic acid and 2.5 parts chlorosulfonic acid. The dope was spun through a 10×100 μm. spinneret into a coagulation bath having a methanesulfonic acid/water ratio of 30/70. The filaments were slightly spin stretchable, being capable of undergoing a spin draw ratio of 1.2. The as-spun properties were:
Tenacity: 2.0 g./d.
Elongation: 3.0%
Modulus: 160 g./d.

EXAMPLE 4

This Example illustrates the spinning of fibers from the polybenzobisoxazole prepared by Run No. 4 listed in Table I of Example 1. The spinning conditions for the fibers exhibiting the best as-spun properties are described.

An 8.6% polybenzobisoxazole dope was prepared by dissolving the polymer in a solvent of 97.5 parts methanesulfonic acid and 2.5 parts chlorosulfonic acid. The dope was spun through a 10×75 μm. spinneret into a coagulation bath having a methanesulfonic acid/water ratio of 30/70. The filaments were slightly spin stretchable, being capable of undergoing a spin draw ratio of 1.43. The as-spun properties were:
Tenacity: 2.6 g./d.
Elongation: 1.7%
Modulus: 269 g./d.

COMPARATIVE EXAMPLE 2

A 9% dope of the polybenzobisoxazole identified as Run No. 2 in Table II of Comparative Example 1 (prepared from terephthalic acid and 4,6-diaminoresorcinol) was prepared in the solvent used in Examples 2–4 (97.5 parts methanesulfonic acid and 2.5 parts chlorosulfonic acid). The dope was spun through a 10×50 μm. spinneret into a 5° C. water coagulation bath.

The filaments wet spun in this manner from PBO polymer prepared from terephthalic acid were so weak that they could not be spin stretched and could be taken up only in the relaxed state. The weak wet filament strength is probably attributable to the relatively low I.V.

The as-spun properties were:
Tenacity: 1.5 g./d.
Elongation: 3.9%
Modulus: 82 g./d.

It can be seen that the tenacity and modulus of fibers spun from a PBO polymer prepared from terephthalic acid are much lower than the tenacity and modulus of fibers spun from PBO polymers prepared from terephthaloyl dichloride according to the process of the present invention.

COMPARATIVE EXAMPLE 3

An 8% dope of the polybenzobisoxazole identified as Run No. 2 in Table II of Comparative Example 1 (prepared from terephthalic acid and 4,6-diaminoresorcinol) was prepared in methanesulfonic acid. The dope was spun through a 10×100 μm. spinneret into a 5° C. water coagulation bath.

Again, the filaments were too weak to be spin stretched and could be taken up only in the relaxed state.

The as-spun properties were:
Tenacity: 1.5 g./d.
Elongation: 3.9%
Modulus: 124 g./d.

Again, the tenacity and modulus values are much lower than those for polymer prepared from terephthaloyl dichloride according to the process of the present invention.

COMPARATIVE EXAMPLE 4

An 8.6% dope of the polybenzobisoxazole identified as Run No. 6 in Table II of Comparative Example 1 (prepared from terephthalic acid and 4,6-diaminoresorcinol) was prepared in a solvent of 97.5 parts methanesulfonic acid and 2.5 parts chlorosulfonic acid. The dope was spun through a 10×100 μm. spinneret into a room temperature coagulation bath having a methanesulfonic acid/water ratio of 30/70.

The filaments wet spun in this manner were so weak that they could not be spin stretched and could be taken up only in the relaxed state.

The best as-spun properties obtained were:
Tenacity: 1.3 g./d.
Elongation: 2.5%
Modulus: 110 g./d.

Again, the tenacity and modulus of fibers spun from a PBO polymer prepared from terephthalic acid are much lower than the tenacity and modulus of fibers spun from PBO polymers prepared from terephthaloyl dichloride according to the process of the present invention.

EXAMPLE 5

The fibers produced by the procedure of Example 2 were heat treated at various temperatures within the range of 425° C. to 500° C., as shown in Table IV. The heat treatment was conducted by gripping the fiber in the test instrument for three minutes at the heat treatment temperature. The fiber was then drawn during the heating at a 10% strain rate until the fiber broke. The broken sample was then tested at room temperature. As can be seen from the results given in Table IV, a dramatic increase in the modulus of heat treated fibers over the modulus of as-spun fibers was observed.

TABLE III

| TREATMENT TEMP. (°C.) | SINGLE FILAMENT FIBER PROPERTIES | | | |
|---|---|---|---|---|
| | D.P.F. | TEN. (g./d.) | ELONG. (%) | MODULUS (g./d.) |
| As Spun | 5.3 | 4.2 | 1.4 | 502 |
| 425 | 4.8 | 4.8 | 0.7 | 711 |
| 450 | 4.9 | 4.4 | 0.6 | 723 |
| 475 | 5.2 | 3.3 | 0.5 | 584 |
| 500 | 5.2 | 4.5 | 0.9 | 559 |

EXAMPLE 6

Poly[([1,2-d:4,5-d']-bisthiazole-2,6-diyl)-1,4-phenylene] (polyparaphenylenebenzobisthiazole; PBT) is prepared from terephthaloyl dichloride and 2,5-diaminodithiohydroquinone dihydrochloride in polyphosphoric acid.

Polyphosphoric acid (115%) is acquired from FMC Corporation or MCD Manufacturing Chemists, Inc. and is deoxygenated by heating under nitrogen at 150° C. overnight. The polymerizations are carried out under nitrogen in 5 l. resin flasks equipped with a spiral agitator.

Equimolar quantities of 2,5-diaminodithiohydroquinone dihydrochloride and pulverized terephthaloyl dichloride are placed under nitrogen in a 5 l. resin flask. Deoxygenated polyphosphoric acid is transferred under nitrogen into the flask. The mixture is stirred at 60° C. for 16 hours, and then at 90° C. for 5 hours to dehydrochlorinate. The following heating stages are used for the polymerization: 130° C. for three hours, 150° C. for sixteen hours, 170° C. for three hours, 185° C. for three hours, and finally 200° C. for 48 hours.

At the end of the polymerization, the polymer is scooped out of the flask and precipiated from the polyphosphoric acid into 11.4 l. of methanol. The polymer is filtered, washed with methanol, and dried at 100° C. The inherent viscosity of the polymer is measured at a concentration of 0.2 weight/volume percent of methanesulfonic acid at a temperature of 25° C. The polymer exhibits an inherent viscosity of at least approximately 25 dl./g. In contrast, PBT prepared from terephthalic acid and exhibits an inherent viscosity within the range of approximately 14 to 20 dl./g.

Although the invention has been described with preferred embodiments, it is to be understood that variations and modifications may be employed as will be apparent to those skilled in the art. Such variations and modifications are to be considered within the purview and scope of the claims appended hereto.

I claim:

1. A process for the production of para ordered heterocyclic polymer having a number average molecular weight of at least approximately 10,000 which comprises heating a first reactant selected from the group consisting of

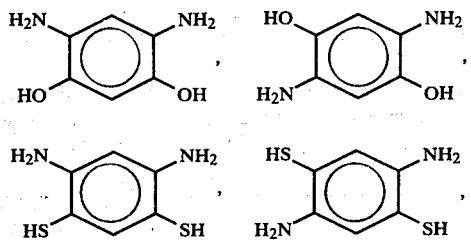

their dihydrochloride salts and mixtures thereof with at least one dihalogen derivative selected from the group consisting of

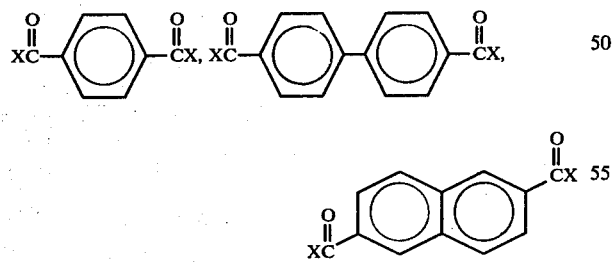

wherein X is F, Cl, Br or I, in polyphosphoric acid at a temperature within the range of approximately 100° C. to 250° C. until the polymerization reaction is complete.

2. A process for the production of para ordered aromatic polybisoxazoles having a number average molecular weight of at least approximately 10,000 which comprises heating at least one aromatic diaminodiol selected from the group consisting of

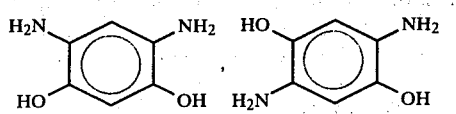

their dihydrochloride salts and mixtures thereof with at least one dihalogen derivative of at least one aromatic dicarboxylic acid selected from the group consisting of

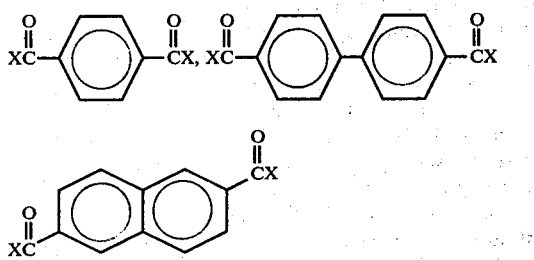

and mixtures thereof wherein X is F, Cl, Br or I in polyphosphoric acid at a temperature within the range of approximately 100° C. to 250° C. until the polymerization is complete.

3. The process of claim 1 wherein said dihalogen derivative is the dichloride derivative.

4. The process of claim 3 further comprising the step of dehydrochlorinating the reaction mixture prior to polymerization.

5. The process of 1 wherein said para ordered aromatic heterocyclic polymer exhibits a number average molecular weight within the range of approximately 10,000 to 30,000.

6. The process of claim 1 wherein said heating is conducted by stages.

7. The process of claim 1 wherein said dihalogen derivative is employed in an amount within the range of approximately 0.8 to 1.2 mole per mole of said first reactant.

8. The process of claim 1 wherein said dihalogen derivative and said first reactant are employed in substantially equimolar amounts.

9. The process of claim 1 wherein said polyphosphoric acid is employed in an amount within the range of approximately 10 to 120 times the weight of said first reactant.

10. The process of claim 2 wherein said diaminodiol is 4,6-diaminoresorcinol.

11. The process of claim 2 wherein said dihalogen derivative is the dichloride derivative.

12. The process of claim 2 wherein said dihalogen derivative is terephthaloyl dichloride.

13. The process of claim 11 further comprising the step of dehydrochlorinating the reaction mixture prior to polymerization.

14. The process of claim 2 wherein said para ordered aromatic polybisoxazole exhibits a number average molecular weight within the range of approximately 10,000 to 30,000.

15. The process of claim 2 wherein said heating is conducted by stages.

16. The process of claim 2 wherein said dihalogen derivative is employed in an amount within the range of approximately 0.8 to 1.2 mole per mole of said diaminodiol.

17. The process of claim 16 wherein said dihalogen derivative and said diaminodiol are employed in substantially equimolar amounts.

18. The process of claim 2 wherein said polyphosphoric acid is employed in an amount within the range of approximately 10 to 120 times the weight of said diaminodiol.

19. A process for the production of polyparaphenylenebenzobisoxazole having a number average molecular weight of at least approximately 10,000 which exhibits an inherent viscosity of at least approximately 2.0 dl./g. when measured at a concentration of approximately 0.2 weight/volume percent in methanesulfonic acid at 25° C., said process comprising the steps of:
  (a) dehydrochlorinating a mixture of 4,6-diaminoresorcinol with terephthaloyl dichloride in polyphosphoric acid by heating the reaction mixture within the range of approximately 30° C. to 95° C. for a period of time sufficient to dehydrochlorinate said reaction mixture; and
  (b) polymerizing said reaction mixture by heating said reaction mixture within the range of approximately 100° C. to 250° C. until the polymerization reaction is complete.

20. The process of claim 19 wherein said 4,6-diaminoresorcinol is initially provided as the dihydrochloride.

21. The process of claim 19 wherein said dehydrochlorinating step (a) is conducted by stages.

22. The process of claim 19 wherein said dehydrochlorinating step (a) is conducted for a period of time of approximately 24 hours.

23. The process of claim 19 wherein said polymerizing step (b) is conducted by stages.

24. The process of claim 19 wherein said terephthaloyl dichloride is employed in an amount within the range of approximately 0.8 to 1.2 mole per mole of said 4,6-diaminoresorcinol.

25. The process of claim 24 wherein said terephthaloyl dichloride and said 4,6-diaminoresorcinol are employed in substantially equimolar amounts.

26. The process of claim 19 wherein said polyphosphoric acid is employed in an amount within the range of approximately 10 to 120 times the weight of said 4,6-diaminoresorcinol.

27. The process of claim 19 wherein said polyparaphenylenebenzobisoxazole exhibits an inherent viscosity within the range of approximately 2.0 to 4.0. dl./g. when measured at a concentration of approximately 0.2 weight/volume percent in methanesulfonic acid at 25° C.

* * * * *